CONTROL SYSTEM FOR A CONCRETE BLOCK FORMING MACHINE

Original Filed March 18, 1958 2 Sheets-Sheet 1

INVENTOR.
HARRY A. WELLNITZ
BY CORBETT, MAHONEY, MILLER & RAMBO, ATTY'S.
BY Wm. V. Miller

CONTROL SYSTEM FOR A CONCRETE BLOCK FORMING MACHINE

Original Filed March 18, 1958 2 Sheets-Sheet 2

INVENTOR.
HARRY A. WELLNITZ
BY CORBETT, MAHONEY, MILLER & RAMBO, ATTY'S.
BY Wm. V. Miller United States Patent Office Re. 25,404
Reissued June 18, 1963

25,404

CONTROL SYSTEM FOR A CONCRETE BLOCK FORMING MACHINE

Harry A. Wellnitz, Columbus, Ohio

Original No. 2,985,935, dated May 30, 1961, Ser. No. 722,256, Mar. 18, 1958. Application for reissue May 9, 1962, Ser. No. 193,907
12 Claims. (Cl. 25—41)

Matter enclosed in heavy brackets [ ] appears in the original patent but forms no part of this reissue specification; matter printed in italics indicates the additions made by reissue.

This invention relates to a control system for a concrete block forming machine. It has to do, more particularly, with a control arrangement which is applicable to a type of concrete block machine now commonly in use for insuring that the blocks formed thereon are of accurate predetermined height without regard to the thickness of the pallets upon which the blocks are formed.

One type of concrete block forming machine now commonly in use includes a sliding material feed box movable between a material-receiving position and a material-discharge position over a mold box open at its top and bottom edges. By a suitable pallet conveyor arrangement mold pallets are moved successively into association with the mold box at its lower edge. As it is moved into association with the mold box, each pallet is supported by a frame and is raised thereby into contact with the lower edge of the mold box and remains there during the molding operation. *Part of this* [This] molding operation occurs after the feed box is moved away from the mold box and at which time a *pressure* stripper head is moved downwardly by its supoprting frame into association with the upper edge of the mold box and will rest freely on the material therein. The mold box is supported by a mold frame which is provided with means for vibrating it during the molding operation. This vibration causes the block material to settle in the mold box on the pallet with the stripper head freely following and contacting the settling material. The stripper head frame is positively moved downwardly relative to the mold box supporting frame to strip the block from the mold box shortly after the vibration of the mold box frame is interrupted, as will later appear. At the same time, by a suitable positive mechanical connection between the stripper frame and the pallet frame, the pallet frame is also moved downwardly so that the pallet moves downwardly simultaneously with the stripper head, the formed block being held between the pallet and the head during this downward movement. This positive mechanical connection comprises fixed depending push rods on the stripper frame which will gradually move into engagement with fixed upstanding push rods on the pallet frame as the stripper frame settles downwardly during the mold vibration. When the push rods on the stripper frame contact the push rods on the pallet frame, an electric control circuit is actuated which stops the vibrating means, and actuates an electric drive motor to drive a series of cams which force the stripping head frame and pallet frame down together and starts other operations of the machine.

An attempt has been made in this prior art machine to accurately control the height of the formed block by having the push rods form the electrical contacts for the electric circuit which, when engaged, stop the vibration and start the stripping operation. However, since one of these contacts is carried by the pallet frame, the thickness of the pallet will have an influence on the instant of contact. Consequently, the thickness of the pallet will affect the height of the formed block, variations in thicknesses of successive [pallet] *pallets* producing variations in height of the successively formed blocks.

According to this present invention, the control circuit is so arranged that the thickness of the pallet will have no effect on the *vertical* thickness *or height* of the formed block. The push rods on the stripper head frame and the pallet frame are not relied upon to complete the circuit to stop the vibration and start the stripping action but the circuit control contacts are provided on the stripper head frame and the mold box or mold box supporting frame so that they will gradually come into contact during the vibrating operation. Thus, the block height measurement is taken off the mold box or its frame rather than off the pallet frame. However, to insure proper positive mechanical connection between the stripper frame and the pallet frame during the stripping action *when the connected frames and mold box move relatively,* there is also provided according to this invention electrically actuated means for [bringing the adjacent ends of the push rods into firm mechanical contact] *establishing a mechanical connection between the two frames which keeps them in relatively spaced relationship. In the example shown and described herein, this means includes means for bringing the adjacent ends of the push rods carried by the respective frames, which are relatively slidable, into firm mechanical contact* at the instant of engagement of the circuit control contacts, regardless of the exact relative vertical positions of the two frames at that time. This insures that there will be no sudden compressive action on the formed green block, [thereby avoiding fracture, but] *such as might crush or fracture the same. Instead* the block will be firmly held *substantially free of compression* between the stripper head and the pallet which will be moved downwardly simultaneously at the same speed. The control system of this invention will be readily adaptable to a prior art machine of the type discussed above with only minor changes in such machine.

In the accompanying drawings there is illustrated diagrammatically a block forming machine of the prior art type discussed above with the control system of this invention applied thereto.

Figure 1:
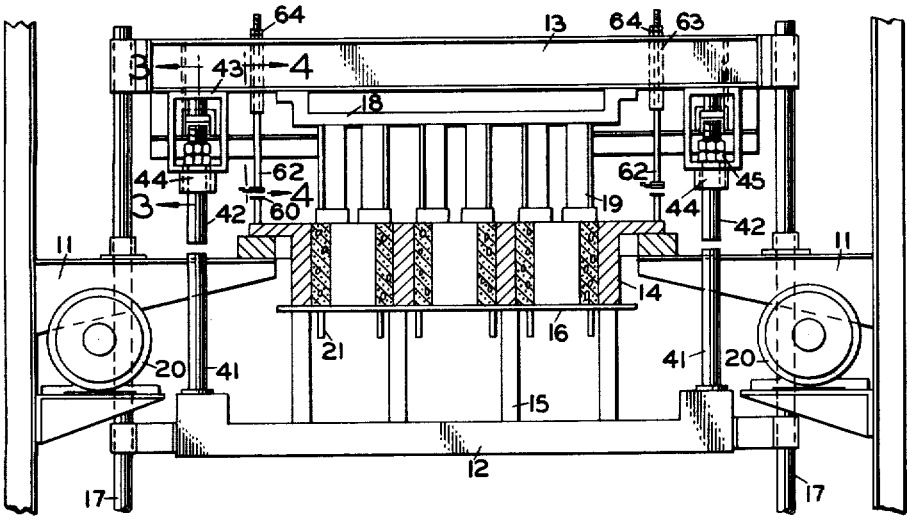
FIGURE 1 is a front elevational view of the block-forming machine with the control system applied thereto showing certain parts of the machine in the relative positions they occupy during the block-forming operation.
Figure 2:
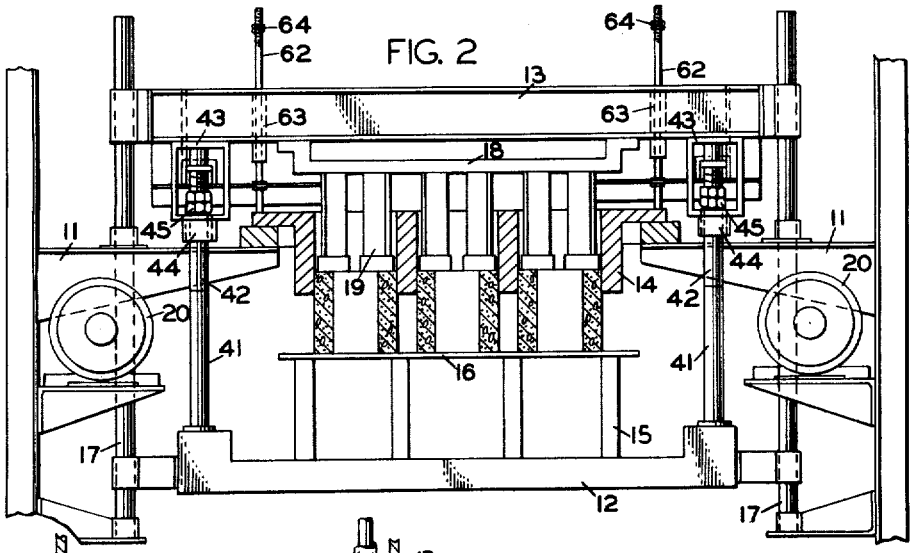
FIGURE 2 is a similar view but showing the relative positions of the parts of the machine during the stripping operation.

With particular reference to the drawings, there is shown in FIGURES 1 and 2, the main elements of a concrete block forming machine which include a mold-box supporting frame 11, a pallet-carrying frame 12, and a pressure head or stripper head supporting frame 13. A mold box 14 is carried by the frame 11 and this frame is fixed in a vertical position. The mold box 14 is open at its upper and lower sides. The pallet frame 12 carries the upstanding laterally spaced pallet supports 15 which at their upper ends receive and support a pallet 16 directly below the position of the mold box 14. The pallet frame 12 is mounted for vertical movement on suitable guides indicated as the guide posts 17 which are also mounted on the frame 11. The stripper frame 13 is provided with the stripper head 18 which includes the depending block strippers 19, the lower ends of which will engage the block forming material during the molding operation and the formed blocks during the stripping operation. The stripper frame 13 is also mounted for vertical movement on a suitable guide structure which may be the same guide posts 17 that carry the pallet frame 12, as shown. Thus, the mold box supporting frame 11 is fixed vertically, the pallet frame 12 is movable vertically, and the stripper head 13 is movable vertically, the latter two frames also being movable vertically relative to each other.

The mold box supporting frame 11 carries at each side thereof a vibrating unit 20 of a suitable type which includes an electric vibrating motor. Obviously, operation of these vibrating units 20 will vibrate the frame 11 and the mold box 14 which it supports.

A suitable conveyor system is provided for successively bringing the empty pallets into association with the pallet frame 12 preparatory to the molding operation and for removing the block carrying pallets therefrom after the molding operation. This conveyor system is not shown in detail but includes the pallet engaging arms 21 (FIGURES 1 and 6) which will move in vertical planes in rectilinear paths, portions of which will be between the pallet supports 15, to move the empty pallet 16 rearwardly over and deposit it on the pallet supports 15, when the pallet frame 12 is lowered, and for lifting the block-carrying pallet from the supports 15 and withdrawing it forwardly of the frame 12 after the molding operation.

The machine also includes the feed box 25 which is mounted for forward and rearward movement on the frame 11. The box 25 is movable from a [forward] *rearward* position, shown in FIGURE 6, where it will receive a charge of block-forming material from a feed hopper (not shown) to a [rear] *forward* position in registry with the mold box 14. At this time, the stripper head 18 will be in a raised position so as not to interfere with the reciprocating movement of the feed box.

Figure 7:
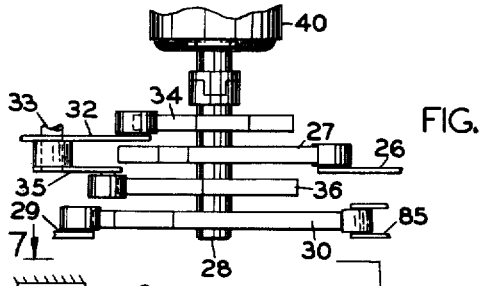
FIGURE 7 is a plan view of the cam means of FIGURE 6.
Figure 6:
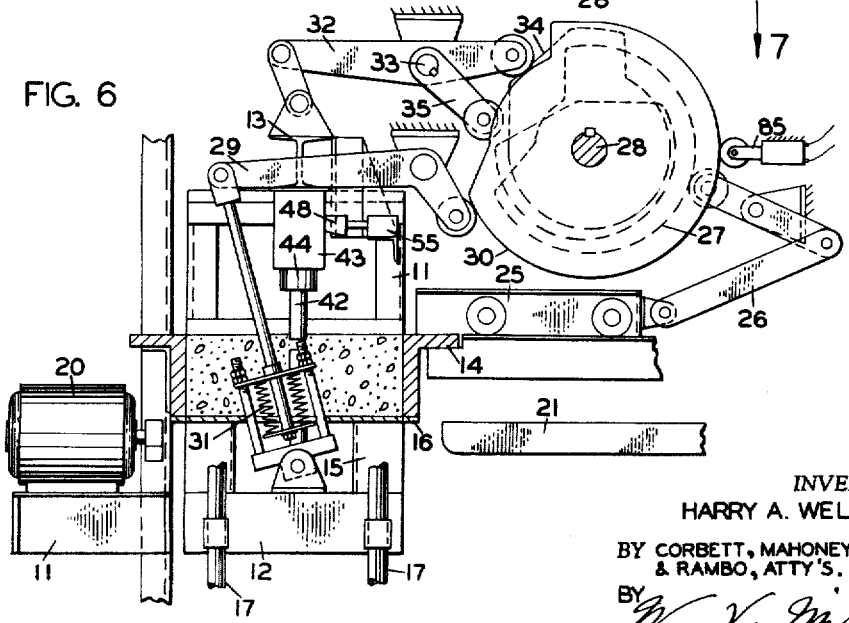
FIGURE 6 is a schematic illustration in vertical section of the cam means controlled by the circuit associated with the units which they control.

The feed box 25 may be reciprocated by suitable linkage 26 actuated by a cam 27 keyed to a driven shaft 28 (FIGURES 6 and 7). The pallet frame 12 is lifted on the guides 17 by means of suitable linkage 29 actuated by a cam 30 keyed on the shaft 28. This linkage includes a compression spring unit 31 to insure that the pallet is held firmly up against the lower edge of the mold box 14, being compressed slightly upon contact of the pallet 16 with the mold box. The stripper frame 13 is moved downwardly, the pallet frame 12 moving therewith as will later appear, by means of linkage including a lever 32 keyed on a supporting shaft 33. This lever 32 is rocked about the axis of the shaft 33 by a cam 34 keyed on the shaft 28. The lever 32 is also rocked about the axis of the shaft 33 by a crank arm 35 which is rocked by a cam 36, keyed on the shaft 28, to raise the stripper frame 13 without raising the pallet frame 12. The driven shaft 28 is driven by an electric drive motor 40.

[The] *A connection is provided between the two frames 12 and 13 for permitting relative vertical movement thereof during the block-forming operation but which can be actuated to keep the two frames in the relatively spaced relationship they have at the time the block-forming operation is completed. In the example shown, for this purpose the* pallet frame 12 is provided at each side thereof with an upstanding push rod 41 (FIGURES 1 and 2) rigidly mounted thereon. The stripper frame 13 is provided with aligning depending push rods 42 but, according to this [invention] *example*, these rods are not rigidly attached to the frame 13 but are mounted for limited vertical movement relative to the frame.

Figure 3:
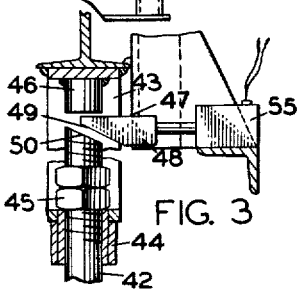
FIGURE 3 is a vertical sectional view taken along line 3—3 of FIGURE 1 showing the electrically controlled wedge means for establishing a firm mechanical connection between the push rods carried by the stripper and pallet frames.
Figure 4:
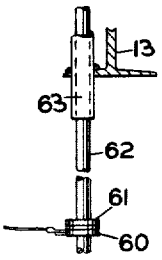
FIGURE 4 is a vertical sectional view taken along line 4—4 of FIGURE 2 showing the block height control electrical contacts carried on the stripper frame and the mold box.

The mounting for each of these rods 42 is shown in FIGURES 1, 2 and 3 as comprising a rectangular open bracket 43 which is rigidly secured to and depends from the stripper frame 13. A sleeve 44 is provided at the lower side of the bracket 43 and the rod 42 is splined for free vertical sliding but non-rotative movement therein. The upper end of the rod 42 is threaded and receives the adjustable lock nuts 45 which serve as stops for cooperating with the lower side of the bracket 43 to limit downward sliding movement of the rod 42. Thus, the rod 42 is normally suspended from the bracket 43. Within the bracket 43 at the upper [side] *end* thereof there is positioned a stop 46 with a flat lower end. This stop 46 is adapted to engage the upper flat surface 47 of a reciprocable wedge 48 which is moved into association therewith. This wedge 48 has an inclined lower surface 49 for engagement with a reversely inclined surface 50 provided on the upper end of the rod 42. The wedge member 48 is reciprocated by means of a solenoid 55 which is carried in fixed position on the frame 13. When the wedge 48 is moved into engagement with the wedge surface 50, the rod 42 is forced downwardly into firm contact with the associated rod 41. When the wedge member 48 is again withdrawn, the rod 42 is free to move vertically of the bracket 43. The nuts 45 will be adjusted to permit any necessary downward movement of the rod 42 when engaged by the wedge 48 before contacting the lower side of the bracket 43. Thus, the rods 41—42 and the associated wedges 48 *normally* cooperate to provide [a normally yieldable connection] *axially spaced relatively movable connecting means* between the pressure frame 13 and the pallet frame 12 [but] which can be *interlocked and* rendered *relatively* non-yieldable by control of the position of the wedges *to insure a fixed relationship between the pressure stripper frame and the pallet frame during the operation of stripping the block from the mold box.*

It will be realized that at the stage when the [positive mechanical connection is to be made between the rods 41—42 that the vertical extent of the spaces between them will vary with variation of thickness of the succesive pallets] *rods 41—42 are to be rendered conjointly operative to establish a fixed spaced relationship between the pressure stripper frame 13 and the pallet frame 12, the spacing between the proximate ends of the rods 41—42 will be dependent upon and vary with variations in thickness of the successively mounted pallets.* The wedges 48 and the mounting thereof inherently provide variable extents of projection to compensate for any variations in the vertical extent of such [spaces] *spacing* and fill [them] *the same* notwithstanding variations *in thickness of the pallets.*

As previously indicated, the measurement which controls the height of the block being formed is taken, according to this invention, from the mold box 14 so that the thickness of the pallet 16 will have no effect on the height of the block. Therefore, as indicated, the mold box 14 is provided at each side thereof with a contact disc 60 which is supported in fixed position on the mold box. For cooperating with each of the contact discs 60, a movable contact disc 61 is associated therewith, being mounted in axial alignment on a rod 62. Each rod 62 is mounted for vertical sliding movement in a sleeve 63 carried by the frame 13 *to permit the necessary relative movement of the rod and frame during the stripping operation.* The upper end of the rod 62 is threaded and is provided with lock nuts 64, the lower of which will engage the upper end of the sleeve 63 normally to suspend the rod in the sleeve. Obviously, adjustment of these nuts 64 on each rod 62 will vary the vertical position of the contact disc 61 relative to the frame 13. As will later appear, these contact discs 60 and 61, when engaged, will complete a circuit to the solenoids 55 and to the drive motor 40 and interrupt the circuit to the vibrator motors 20. *This will determine the extent of movement of the pressure stripper head 18 down through the open top of the mold box 14 and into the box to compact the block forming material therein to a predetermined height.*

In actual practice, the drive motor 40 will be a continuously operating motor and a magnetic clutch (not shown) will be provided between its drive shaft and the driven cam shaft 28. However, for simplicity, the circuit is shown as directly controlling the motor.

Figure 5:
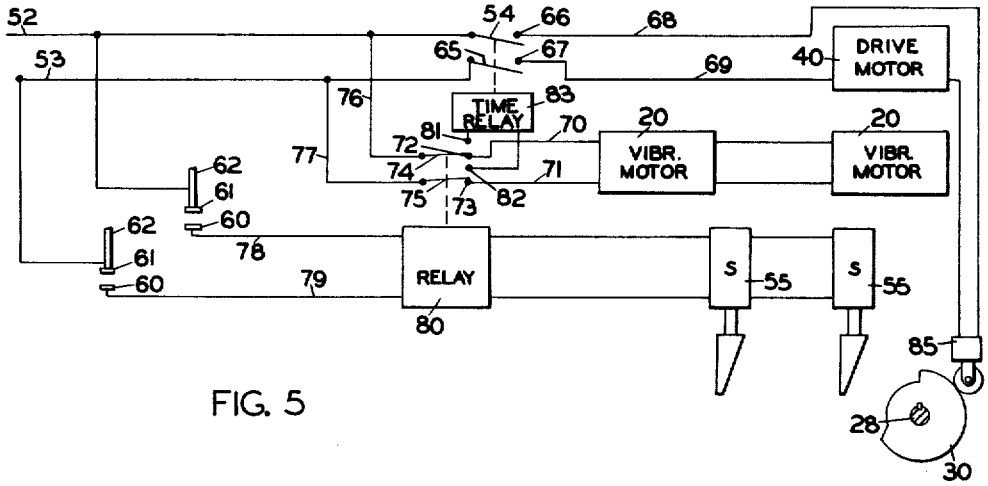
FIGURE 5 is a schematic circuit diagram of a suitable control circuit for the machine.

The circuit is illustrated in FIGURE 5 and is shown as comprising the main lines 52 and 53 leading from a suitable source of power. The line 52 is connected to a movable switch arm 54 and the line 53 to a movable switch arm 65. The arms 54 and 65 are normally spaced from the fixed contacts 66 and 67, respectively, which are connected by the respective lines 68 and 69 to the drive motor 40. The vibrating motors 20 are connected in the circuit parallel to the motor 40 by means including the lines 70 and 71 connected to the respective fixed contact points 72 and 73. Normally contacting with these points 72 and 73 are the respective movable switch arms 74 and 75. These arms 74 and 75 are connected to the power lines 52 and 53 by the respective lines 76 and 77. Another circuit parallel with the motor circuits is connected to the line 52 and 53 and includes the lines 78 and 79. Connected in series in this circuit are the two sets of disc contacts 60 and 61, a relay 80 and the two wedge-operating solenoids 55. The relay 80 controls the contact arms 74 and 75 which are normally engaged with the points 72 and 73. Associated with these arms 74 and 75 are the respective fixed contact points 81 and 82 that control a time delay relay 83 which, in turn, controls the contact arms 54 and 65. When the relay 80 is energized, it stops the vibrators 20 and starts timing of the relay 83, which after a set period, will energize the motor 40. The time-delay relay 80 will be actuated only when both sets of associated contacts 60 and 61 are engaged. When both of these sets are engaged, the solenoids 55 will also be energized to project the wedge members 48 into operative position. A normally closed switch 85 is connected in the line 68 and is controlled by the cam 30 to open and break the circuit to the motor 40 after it has been energized for a predetermined period.

The nuts 64 on the contact rods 62 are adjusted to position the contact discs 61 so that they will be at a predetermined level relative to the contact discs 60 at the beginning of the molding operation. The nuts 45 on the push rods 42 are also adjusted to position the lower ends of the rods 42 at a predetermined level at the start of the molding operation. Usually these rods will be spaced above the rods 41 but their adjacent ends can be in contact if sufficient movement up into the bracket 43 is permitted.

Assuming the parts of the machine are in the relative positions indicated in FIGURE 1 as the molding operation is nearing completion with the circuit in the condition illustrated in FIGURE 5 so that the vibrating motors 20 are operating and the drive motor 40 is deenergized, the sequence of operation of the machine will be as follows:

As the vibration continues, the contact discs 61 will gradually move downwardly towards the discs 60. As soon as contact is made, the relay 80 will be actuated and the vibrating motors 20 will be deenergized and the drive motor control timing relay 80 will be energized. Shortly thereafter the motor 40 will be energized thereby rotating the cam shaft 28. The solenoids 55 are energized at the same time as the relay 80 is actuated and, consequently, the wedge members 48 will be projected into position where they cause the ends of the cooperating push rods 42 and 41 to contact firmly with each other so that the stripper frame 13 will push the pallet frame 12 downwardly with it.

Stopping of the vibrating units 20 determines the height of the blocks being molded at that time. Rotating the cam shaft 28 will rotate the cams carried thereby and this will produce the required relative movements of the parts of the machine. The stripper head 18 will be moved downwardly and at the same time will force the pallet 16 downwardly at the same speed. The time delay in starting the drive motor 40 after stopping the vibration insures that the wedges 48 will be in operative position before downward movement of the stripper head 18 starts. When the pallet 16 reaches its lower position, the arms 21 will remove the filled pallet and replace it with an empty pallet. Continued rotation of the shaft 28 will raise the pallet frame 12, raise the stripper head 18, project the feed box 25 forwardly, withdraw the feed box 25, [de-energized] *de-energize* the drive motor 40 and allow the stripper head to settle on the material in the feed box so that the machine will again be in the condition shown in FIGURE 1.

It will be apparent from the above, that this invention provides a control system for a machine of the type indicated wherein the height of the block is controlled accurately without being affected by the thickness of the pallets which will vary due to the wear of the pallets. Formerly, these pallets, when [worm] *worn* slightly by the abrasive block material, would have to be discarded, considerably increasing the cost of production of the blocks. According to this invention, the height limitation is taken off the mold box [frame] and still means is provided for insuring firm mechanical contact between the *pressure* stripper frame and the pallet *support* frame. This latter means embodies *push means on the respective frames which permit relative movement of the two frames during the block-forming operation but which have means cooperating therewith for keeping the two frames in the relatively spaced relationship they have at the instant the block is completed so that the spaced frames as a unit and the mold box can move relatively to one another for the stripping operation without any possibility of crushing or fracturing the green block. In the example shown and described herein this push means comprises* sets of push rods carried by the two frames, one set being rigidly carried by the one frame and the other set being connected to the other frame for relative vertical movement but having the wedge means associated therewith for locking it at times to the other frame.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. In combination with a concrete block forming machine including a mold frame mounted in fixed vertical position and carrying a mold box in which the block is to be formed and which is open at its top and bottom, first electrically-actuated means for vibrating the mold box on the mold frame, a pressure frame carrying a pressure head for engaging the material through the open top of the mold box during vibration and mounted for downward movement relative to the mold frame so that the pressure head will settle with the material in the mold box during vibration, a pallet frame mounted for vertical movement relative to the mold frame and pressure frame carrying a pallet on which the block is formed and which is normally disposed below said mold box for cooperation with the open bottom thereof, a normally yieldable connection between said pressure frame and said pallet frame comprising a structure on each of said frames, one of said structures having a sliding movement relatively to the other structure, for permitting the pressure head to engage the material in the mold box during vibration and to settle along with such material during the vibration relative to said mold frame and said pallet frame, second electrically-actuated means for acting on said connection having a normally retracted part carried by said pressure frame and projectable relatively to said yieldable connection to a position preventing said sliding movement to render said connection non-yieldable to provide a pressure-transmitting connection between said pressure frame and said pallet frame, a third electrically-actuated means for applying pressure to said pressure frame so as to move the pressure head downwardly relative to the mold box to strip the formed block therefrom and to apply pressure through said connection to move the pallet frame downwardly therewith so as to simultaneously move the pallet downwardly away from the mold box, an electric circuit for controlling all of said electrically-actuated means and having such means connected therein, a first contact located at a selected level relative to the mold frame above said pallet and connected in said circuit, a cooperating second contact on the pressure frame above said first contact for settling movement with the pressure frame into engagement with the first contact and connected in said circuit, and means connected in said circuit with all of said electrically-actuated means and said contacts so that when the contacts are engaged said first electrically-actuated vibrating means is rendered inoperative, said second electrically-actuated means is actuated to make said connection non-yieldable, and said third electrically-actuated pressure-applying means is actuated to apply pressure to said pressure frame and connection to move said pallet frame downwardly and to strip the block downwardly from the mold box.

2. The combination of claim 1 in which said last-named means includes timing means for delay actuation of said pressure-applying means after said vibrating means is rendered inoperative and said connection is made non-yieldable.

3. The combination of claim 1 in which said first-mentioned structure is a push-rod carried by the pressure frame and the second-mentioned structure is a cooperating push-rod carried by the pallet frame, said part of said second electrically actuated means being a wedge which acts on said push-rods.

4. The combination of claim 3 in which said connection includes a bracket in which the slidable push rod is mounted, a wedge surface on the slidable push rod and a stop surface on the bracket, said wedge member being movable between said wedge surface and said stop surface.

5. The combination of claim 1 in which said second contact is suspended from said pressure frame for vertical upward movement relative thereto.

6. In combination with a concrete block-forming machine including a mold box in which the block is to be formed, first electrically-actuated means for vibrating said mold box, a pressure head for engaging the material in the mold box during vibration and mounted for relative movement to the mold box so that it will settle with the material in the mold box during vibration, a pallet frame and a pallet mounted for vertical movement relative to the mold box and pressure head and being associated with the mold box during the forming of the block, a normally yieldable connection between said pressure head and said pallet frame comprising structure on said pressure head, structure on said pallet frame, one of said structures having a sliding movement relatively to the other structure, second electrically-actuated means having a normally retracted part carried by said pressure head and projectable relatively to said yieldable connection to a position preventing said sliding movement for acting on said connection to render it non-yieldable to provide a pressure-transmitting connection between said pressure head and said pallet, a third electrically-actuated means for applying pressure to said pressure head and to simultaneously apply pressure through said connection to strip the block from the mold box, an electric circuit for controlling all of said electrically-actuated means and having such means connected therein, a first contact located at a selected level relative to the mold box above said pallet and connected in said circuit, a cooperating second contact above said first contact for settling movement with the pressure head into engagement with the first contact and connected in said circuit, and means connected in said circuit with all of said electrically-actuated means and said contacts so that when the contacts are engaged said first electrically-actuated vibrating means is rendered inoperative, said second electrically-actuated means is actuated to make said connection non-yieldable, and said third electrically-actuated means is actuated to apply pressure to said pressure head and the pallet to strip the block from the mold box.

7. A block-forming machine having a frame, a mold open at top and bottom and means to vibrate the mold until block-forming material supplied thereto reaches a predetermined level, a pallet below the mold on which the block formed from the material rests, a supporting frame for the pallet to close the bottom of the mold, and a pressure frame having a pressure head movable downwardly and relatively to the pallet supporting frame to tamp said material to the said level; rod means on said *pallet* supporting frame, rod means on the pressure frame, one of said rod means having a sliding movement relatively to the other rod means, and coupling means on *one of the two last-named frames* [the frame] normally permitting said relative sliding movement of the rod *means* and capable of coupling said [rods] *rod means* to prevent sliding movement, control means mounted on the machine timed to actuate, upon said level being reached, the [last mentioned] *coupling* means to couple said rod means and accordingly said pressure head and pallet frame against relative downward movement and to unitarily move such coupled pressure head and pallet frame downwardly to strip the formed block from the mold upon [continual] *continued* downward movement of the pressure head, whereby the thickness of the formed block is not affected by the thickness of the pallet.

8. A block-forming machine according to claim 7 wherein said rod means *comprise elements which,* when said level is reached, will be spaced apart distances which vary with variations in thickness of the successive pallets employed, and said coupling means being wedge-shape and having a lateral movement into the space variable to compensate for the variations in the spacing of said elements.

*9. In a block forming machine of the type including a mold box having an open top through which it may be charged with moldable material and an open bottom, a pallet-supporting frame carrying a pallet to close said mold box bottom during the block forming operation and to receive the formed block thereon, a pressure stripper head frame mounted on said machine and carrying a pressure stripper head in cooperative relationship with the open top of the mold box and movable vertically relative thereinto through the open top to compact the block forming material in the mold box; spacing means on the respective pallet-supporting and pressure stripper head frames normally operable to afford relative vertical movement therebetween during the block compacting operation but capable of fixedly spacing said frames against vertical movement thereof toward each other upon completion of the block compacting operation, said spacing means including stop portions spaced vertically from each other during the block compacting operation but movable vertically toward each other during such operation by vertical movement of the pressure stripper head frame and head carried thereby relative to the pallet-supporting frame and the pallet carried thereby to provide a variable space therebetween whereby height of the formed block is not affected by variations in pallet thickness, and variable means operable to take-up the space*

*between said stop portions to prevent further relative movement toward each other and to thereby fixedly space said pallet-supporting frame and said pressure stripper head frame against relative movement toward each other to prevent crushing of the formed block between the pallet and the pressure stripper head during the stripping action and to provide unitary movement thereof and the mold box relatively vertically so as to strip the formed block from the mold; and cooperating block height sensing means operatively connected to said variable space filling means to actuate said space filling means upon completion of the block compacting operation and thereby determine the extent of movement of the pressure stripper head into the mold box, said sensing means comprising a sensing member carried by the pressure stripper head frame and a cooperating sensing member carried by the mold box in relatively spaced relationship for movement toward each other by the relative movement of the pressure stripper head frame and mold box during the block compacting operation so as to contact each other upon completion of the operation, said sensing member carried by the pressure stripper head frame being mounted for vertical movement relative to the pressure stripper head frame so as to permit the necessary relative movement of the pressure stripper head frame and the mold box during the stripping operation.*

*10. In a block forming machine of the type including a mold box having an open bottom, a pallet-supporting frame carrying a pallet to close said mold box bottom during the block forming operation, a pressure stripper head frame mounted on said machine and carrying a pressure stripper head in cooperative relationship with the mold box and movable vertically relative thereto to compact the block forming material in the mold box; spacing means on the respective pallet-supporting and pressure stripper head frames normally operable to afford relative vertical movement therebetween during the block compacting operation but capable of fixedly spacing said frames against vertical movement thereof toward each other upon completion of the block compacting operation, said spacing means including stop portions spaced vertically from each other during the block compacting operation but movable vertically toward each other during such operation by vertical movement of the pressure stripper head frame and head carried thereby relative to the pallet-supporting frame and the pallet carried thereby to provide a variable space therebetween whereby height of the formed block is not affected by variations in pallet thickness, and variable means operable to take-up the space between said stop portions to prevent further relative movement toward each other and to thereby fixedly space said pallet-supporting frame and said pressure stripper head frame against relative movement toward each other to prevent crushing of the formed block between the pallet and the pressure stripper head during the stripping action and to provide unitary movement thereof and the mold box relatively vertically so as to strip the formed block from the mold; and cooperating block height sensing means operatively connected to said variable space take-up means to actuate said take-up means to thereby determine the extent of relative vertical movement of the pressure stripper head and mold box to complete the block compacting operation, said sensing means comprising a sensing device carried by the pressure stripper head frame and a cooperating sensing device carried by the mold box for relative vertical movement by the relative vertical movement of the pressure stripper head frame and mold box during the block compacting operation so as to cooperate with each other upon completion of the operation to actuate said space take-up means.*

*11. In a block forming machine of the type including a mold box, a pallet-supporting frame carrying a pallet in cooperation with said mold box during the block forming operation, a pressure stripper head frame mounted on said machine and carrying a pressure stripper head in cooperative relationship with the mold box and movable relative thereto to compact the block forming material in the mold box between contact surfaces of the head and the pallet; spacing means on the respective pallet-supporting and pressure stripper head frames normally operable to afford relative movement therebetween during the block compacting operation but capable of fixedly spacing said frames against movement thereof toward each other upon completion of the block-compacting operation, said spacing means including spacer portions spaced from each other during the block-compacting operation but movable toward each other during such operation by movement of the pressure stripper head frame and head carried thereby relative to the pallet-supporting frame and the pallet carried thereby to provide a variable space therebetween whereby that dimension of the block formed between the pressure stripper head and the pallet contact surfaces is not affected by variations in pallet thickness, and variable means operable to take-up the space between said spacer portions to prevent further relative movement toward each other and to thereby fixedly space said pallet-supporting frame and said pressure stripper head frame against relative movement toward each other to prevent crushing of the formed block between the pallet and the pressure stripper head during the stripping action and to provide unitary movement thereof and the mold box relatively so as to strip the formed block from the mold; and cooperating sensing means operatively connected to said variable space take-up means to actuate said take-up means to thereby determine the extent of relative movement of the pressure stripper head and mold box to complete the block compacting operation, said sensing means comprising sensing portions on the pressure stripper head frame and the mold box for relative movement by the relative movement of the pressure stripper head frame and mold box during the block compacting operation so as to cooperate with each other upon completion of the operation to actuate said space take-up means.*

*12. In a block forming machine of the type including a mold box, a pallet-supporting frame carrying a pallet in cooperation with said mold box during the block forming operation, a pressure stripper head frame mounted on said machine and carrying a pressure stripper head in cooperative relationship with the mold box and movable relative thereto to compact the block forming material in the mold box against one pallet; spacer portions on the respective pallet-supporting and pressure stripper head frames and spaced from each other during the block compacting operation but movable toward each other during such operation by movement of the pressure stripper head frame and head carried thereby relative to the pallet supporting frame and the pallet carried thereby to provide a variable space therebetween whereby the dimension of the formed block between the pressure stripper head and pallet is not affected by variations in pallet thickness, and means operable to take-up the variable space between said spacer portions to prevent further relative movement toward each other and to thereby fixedly space said pallet-supporting frame and said pressure stripper head frame against relative movement toward each other to prevent crushing of the formed block between the pallet and the pressure stripper head during the stripping action and to provide unitary movement thereof and the mold box relatively so as to strip the formed block from the mold; and cooperating sensing means operatively connected to said space take-up means to actuate said take-up means to thereby determine the extent of relative movement of the pressure stripper head and mold box to complete the block compacting operation, said sensing means comprising sensing portions on the pressure stripper head frame and the mold box for relative movement by the relative movement of the pressure stripper head frame and mold box during the block com-*

*pacting operation so as to cooperate with each other upon completion of the operation to actuate said space take-up means.*

References Cited in the file of this patent or the original patent

UNITED STATES PATENTS

| | | |
|---|---|---|
| 2,270,829 | Wellnitz | Jan. 20, 1942 |
| 2,308,132 | Wellnitz | Jan. 12, 1943 |
| 2,366,780 | Gelbman et al. | Jan. 9, 1945 |
| 2,431,034 | Gelbman | Nov. 18, 1947 |
| 2,685,116 | Schutt | Aug. 3, 1954 |
| 2,697,263 | Van Ornum | Dec. 21, 1954 |

FOREIGN PATENTS

| | | |
|---|---|---|
| 748,464 | Great Britain | May 2, 1956 |